(12) United States Patent  
Chen et al.

(10) Patent No.: US 12,526,349 B2
(45) Date of Patent: Jan. 13, 2026

(54) DATA PROCESSING METHOD, ELECTRONIC DEVICE, AND COMPUTER-READABLE STORAGE MEDIUM

(71) Applicant: WANGSU SCIENCE & TECHNOLOGY CO., LTD., Shanghai (CN)

(72) Inventors: Xiangxiang Chen, Shanghai (CN); Xiaochuan Zhuang, Shanghai (CN)

(73) Assignee: WANGSU SCIENCE & TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 18/559,035

(22) PCT Filed: May 19, 2023

(86) PCT No.: PCT/CN2023/095393
§ 371 (c)(1),
(2) Date: Nov. 3, 2023

(87) PCT Pub. No.: WO2024/119720
PCT Pub. Date: Jun. 13, 2024

(65) Prior Publication Data
US 2025/0106310 A1    Mar. 27, 2025

(30) Foreign Application Priority Data
Dec. 5, 2022   (CN) .......................... 202211552341.0

(51) Int. Cl.
*H04L 69/164*    (2022.01)
*H04L 67/02*    (2022.01)

(52) U.S. Cl.
CPC ............ *H04L 69/164* (2013.01); *H04L 67/02* (2013.01)

(58) Field of Classification Search
CPC ....... H04L 67/60; H04L 67/56; H04L 69/169; H04L 69/165; H04L 67/02; H04L 63/166
See application file for complete search history.

(56) References Cited

U.S. PATENT DOCUMENTS 9,191,374 B1 * 11/2015 Kim ........................ H04L 67/60
11,115,504 B2 * 9/2021 Balasubramanian .......................
                                                        H04L 69/169
(Continued)

FOREIGN PATENT DOCUMENTS

CN        111490963 A        8/2020
CN        111614694 A  *    9/2020 ............. H04L 69/03
(Continued)

OTHER PUBLICATIONS

Wangsu Science & Technology Co., Ltd., Chinese First Examination Report with English Translation, CN 202211552341.0, Mar. 31, 2025, 30 pgs.
(Continued)

*Primary Examiner* — Chirag R Patel
(74) *Attorney, Agent, or Firm* — USCH Law, PC

(57) ABSTRACT

Disclosed are a data processing method, an electronic device, and a computer-readable storage medium. During uplink transmission, upon receiving a first QUIC message from a client device over a target UDP port, an NGINX server sends the first QUIC message to the QUIC protocol stack, such that the QUIC protocol stack processes the first QUIC message to derive application layer data, and sends a first data stream including a first application layer data packet to an upstream server. During downlink transmission, the NGINX server receives a second data stream from the upstream server, caches a second application layer data packet included in the second data stream into a second cache, and delivers the second application layer data packet to the QUIC protocol stack for processing when the QUIC (Continued)

protocol stack is writable to derive a second QUIC message and sends the second QUIC message to the client device.

18 Claims, 4 Drawing Sheets

(56) References Cited

U.S. PATENT DOCUMENTS

| | | | | |
|---|---|---|---|---|
| 11,758,015 | B2* | 9/2023 | Sotnikov | H04L 67/5681 |
| | | | | 709/213 |
| 11,956,221 | B2* | 4/2024 | Viswambharan | H04L 63/0428 |
| 12,166,825 | B2* | 12/2024 | Parla | H04L 67/56 |
| 2018/0036591 | A1* | 2/2018 | King | H04N 5/76 |
| 2021/0014328 | A1* | 1/2021 | Singhal | H04L 69/16 |
| 2021/0045186 | A1* | 2/2021 | Fu | H04L 9/0894 |
| 2022/0091892 | A1 | 3/2022 | Wang et al. | |
| 2022/0116319 | A1 | 4/2022 | Dutta et al. | |
| 2022/0141543 | A1* | 5/2022 | Turnbull | H04N 21/6408 |
| | | | | 709/231 |
| 2024/0137430 | A1* | 4/2024 | Deval | H04L 69/324 |
| 2024/0171810 | A1* | 5/2024 | Lakshminarasimhan | |
| | | | | H04L 67/568 |
| 2025/0016244 | A1* | 1/2025 | Ihlar | H04L 67/56 |

FOREIGN PATENT DOCUMENTS

| | | | | |
|---|---|---|---|---|
| CN | 111835651 | A | | 10/2020 |
| CN | 112311774 | A | | 2/2021 |
| CN | 112653740 | A * | 4/2021 | H04L 67/1002 |
| CN | 110233880 | B * | 12/2021 | H04L 67/32 |
| CN | 113742111 | A | | 12/2021 |
| CN | 114143386 | A | | 3/2022 |
| CN | 114448847 | A | | 5/2022 |
| CN | 114531499 | A | | 5/2022 |
| CN | 115334138 | A | | 11/2022 |
| WO | 2022228011 | A1 | | 11/2022 |

OTHER PUBLICATIONS

Wangsu Science & Technology Co., Ltd., European Search Report, EP23798329.1, Aug. 8, 2025, 12 pgs.

* cited by examiner

DATA PROCESSING METHOD, ELECTRONIC DEVICE, AND COMPUTER-READABLE STORAGE MEDIUM

CROSS-REFERENCE TO RELATED APPLICATIONS

The present application is a United States National Stage Application filed under 35 U.S.C. § 371 of PCT Patent Application Serial No. PCT/CN2023/095393, filed May 19, 2023, which claims priority to Chinese Patent Application No. CN2022115522341.0, filed on Dec. 5, 2022, each of which is incorporated by reference herein in its entirety.

TECHNICAL FIELD

The various embodiments described in this document relate in general to the field of Internet technologies, and in particular to a data processing method, an electronic device, and a computer-readable storage medium.

BACKGROUND

User Datagram Protocol (UDP) is a connectionless transport layer protocol in the Open System Interconnection (OSI) reference model. Quick UDP Internet Connections (QUIC) protocol is a low-latency UDP-based Internet transport layer protocol initially designed by Google, which has many advantages, such as reducing connection latency, avoiding head-of-line blocking, and the like.

NGINX is a high-performance Hypertext Transfer Protocol (HTTP) server which may also be used as a reverse proxy server, and has the features of high concurrency, good performance, less memory occupation, and the like. Currently, in a scenario of using QUIC based on NGINX, Hypertext Transfer Protocol (HTTP)/3.0 messages are transmitted over port 443.

However, port 443 supports only one type of application layer protocol, that is, only HTTP/3.0 is supported but other application layer protocols are not supported. As a result, the scenario of using QUIC based on NGINX is limited, and no more services are supported.

SUMMARY

Embodiments of the present disclosure provide a data processing method, an electronic device, and a computer-readable storage medium. By integrating a QUIC protocol stack on an NGINX server, a scenario of using QUIC based on NGINX is practiced and a variety of types of application layer protocols are supported, and in addition, different application layer protocols use a same UDP port, thereby reducing port overhead.

In a first aspect, the embodiments of the present disclosure provide a data processing method, applicable to an NGINX server integrated with a QUIC protocol stack. The method includes:
receiving a first QUIC message from a client device over a target UDP port, the target UDP port supporting a variety of application layer protocols;
sending the first QUIC message to the QUIC protocol stack, such that the QUIC protocol stack processes the first QUIC message to derive application layer data; and
sending a first data stream including a first application layer data packet to an upstream server according to a protocol type of the first application layer data packet, the first application layer data packet at least including the application layer data corresponding to one of first QUIC messages.

In a second aspect, the embodiments of the present disclosure provide an electronic device. The electronic device includes: a processor, a memory, and one or more computer programs that are stored in the memory and executable by the processor. The one or more computer programs, when loaded and executed by the processor, cause the electronic device to perform the method as described in the first aspect or various possible implementations of the first aspect.

In a third aspect, the embodiments of the present disclosure further provide a computer-readable storage medium. The computer-readable storage medium stores one or more computer instructions. The one or more computer instructions, when loaded and executed by a processor, cause the processor to perform the method as described in the first aspect or various possible implementations of the first aspect.

The data processing method, the electronic device, and the computer-readable storage medium according to the embodiments of the present disclosure are all applicable to an NGINX server integrated with a QUIC protocol stack. During uplink transmission, upon receiving a first QUIC message from a client device, the NGINX server sends the first QUIC message to the QUIC protocol stack, such that the QUIC protocol stack processes the first QUIC message to derive application layer data, and sends a first data stream including a first application layer data packet to an upstream server. During downlink transmission, the NGINX server receives a second data stream from the upstream server, caches a second application layer data packet included in the second data stream into a second cache, and delivers the second application layer data packet to the QUIC protocol stack for processing when the QUIC protocol stack is writable to derive a second QUIC message and sends the second QUIC message to the client device. With the technical solutions, by integrating a QUIC protocol stack on an NGINX server, a scenario of using QUIC based on NGINX is practiced and a variety of types of application layer protocols are supported, and in addition, different application layer protocols use a same UDP port, thereby reducing port overhead.

BRIEF DESCRIPTION OF THE DRAWINGS

For clearer descriptions of technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

For clearer descriptions of the objectives, technical solutions, and advantages of the present disclosure, embodiments of the present disclosure are described hereinafter in detail with reference to the accompanying drawings.

With prevalence of QUIC protocol, the third version Hypertext Transfer Protocol/3.0 (HTTP/3.0) has been standardized, more and more manufacturers are releasing products supporting request transmission based on HTTP using QUIC protocol. This scenario of using QUIC is referred to as HTTP/3.0 over QUIC.

Real-Time Messaging Protocol (RTMP) is a commonly used protocol in a scenario of down and up streaming in the live streaming field. With the development of QUIC, RTMP over QUIC is also on demand.

At present, HTTP/3.0 over QUIC uses HTTP/3.0. However, in web applications or other fields, some customers demand HTTP/1.1 over QUIC or HTTP/2.0 over QUIC. The conventional HTTP over QUIC scenario only supports HTTP/3.0, but does not support other application layer protocols, for example, HTTP/1.1, HTTP/2.0, RTMP, or the like. In the scenario of HTTP/3.0 over QUIC, HTTP/3.0 messages are transmitted over port 443.

To enable a scenario where QUIC works hand-in-hand with protocols to support other application layer protocols in addition to HTTP/3.0, a typical solution is to assign a UDP port to each of the application layer protocols. Thus, different application layer protocols correspond to different UDP ports, such that QUIC is capable of servicing a variety of different application layer protocols.

However, when different UDP ports are assigned to different application layer protocols, overheads of UDP ports are great due to a large number of ports.

Accordingly, embodiments of the present disclosure provide a data processing method and apparatus, an electronic device, and a system. By integrating a QUIC protocol stack on an NGINX server, a variety of types of application layer protocols are simultaneously supported under a scenario of using QUIC based on NGINX, and in addition, different application layer protocols use a same UDP port, thereby reducing port overhead.

Figure 1:
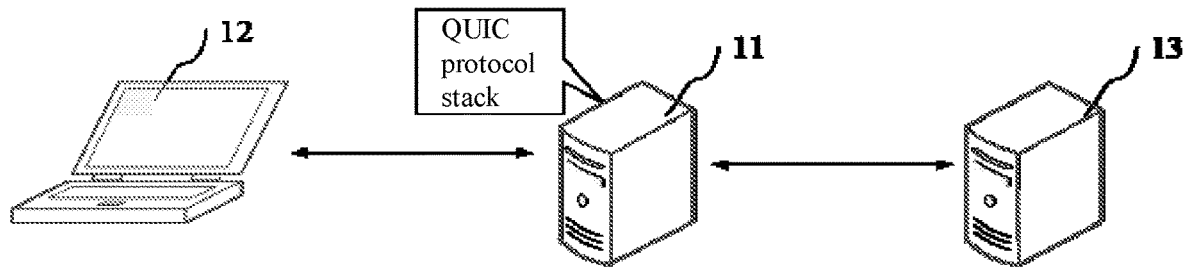
FIG. 1 is a schematic diagram of network architecture applicable to a data processing method according to some embodiments of the present disclosure.

FIG. 1 is a schematic diagram of network architecture applicable to a data processing method according to some embodiments of the present disclosure. Referring to FIG. 1, the network architecture includes an NGINX server 11, a client device 12, and an upstream server 13. A network connection is established between the NGINX server 11 and the client device 12, and a network connection is also established between the NGINX server 11 and the upstream server 13.

The NGINX server 11 integrates a QUIC protocol stack. The QUIC protocol stack is, for example, a self-developed protocol stack or an open source-based protocol stack. The NGINX server 11 is a proxy server, and is additionally provided with a functionality of processing the QUIC protocol stack. For example, an NGX-QUIC module is additionally arranged on the NGINX server 11. The NGX-QUIC module is responsible for processing the QUIC protocol stack, including processing configuration items of QUIC, processing services of QUIC, and the like.

The client device 12 includes, but is not limited to, a mobile phone, a tablet computer, a personal computer, an electronic reader, a lap-top computer, a desktop computer, a server, and the like that run an Android operating system, a Microsoft operating system, a Symbian operating system, a Linux operating system, or an iOS operating system. In the field of live streaming, the client device 12 may be a streamer terminal or a viewer terminal. When the client device 12 is a streamer terminal, up streaming to the upstream server 13 is performed using the NGINX server 11. When the client device 12 is a viewer terminal, down streaming from the upstream server 13 is performed using the NGINX server 11.

The upstream server 13 is a stream media server, for example, a live streaming server or the like.

It should be understood that the NGINX server 11, the client device 12, and the upstream server 13 are illustrated in FIG. 1 in a schematic quantity. In practice, any quantity of the NGINX servers 11, the client devices 12, and the upstream servers 13 may be deployed according to actual needs.

Figure 2:
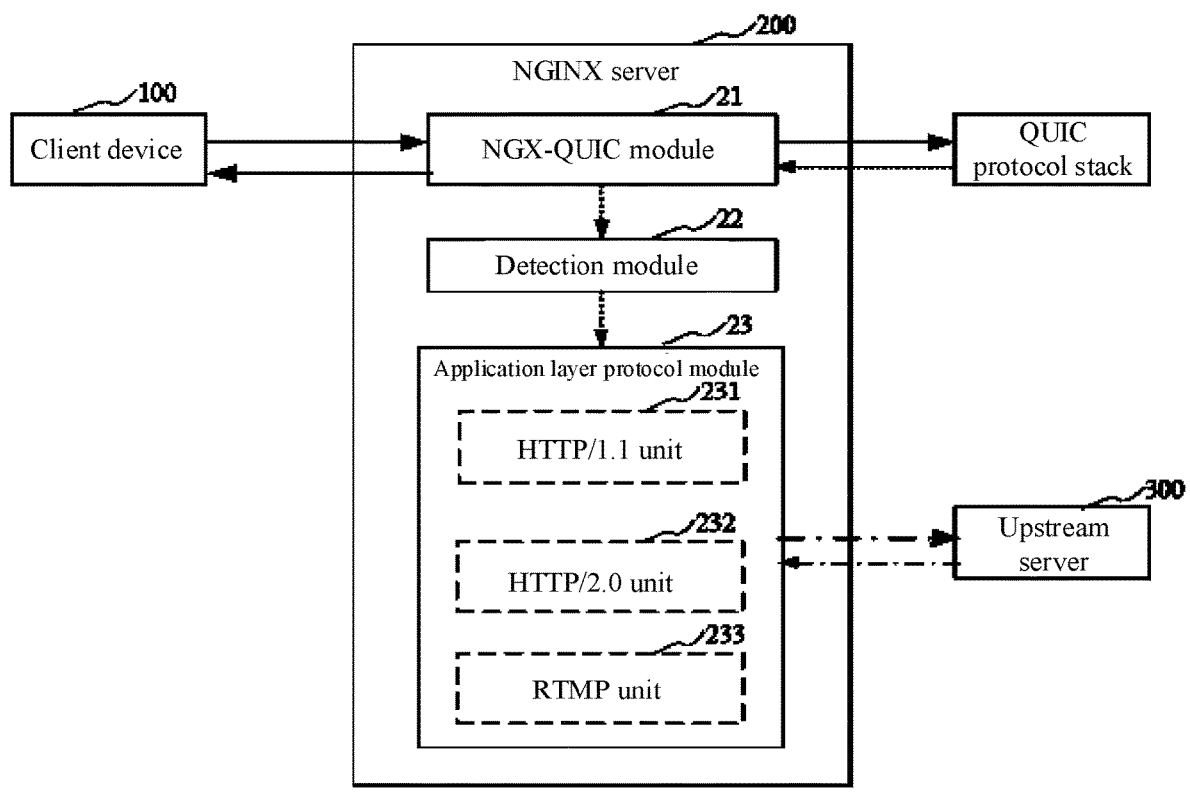
FIG. 2 is a schematic structural diagram of an NGINX server according to some embodiments of the present disclosure.

FIG. 2 is a schematic structural diagram of an NGINX server 200 according to some embodiments of the present disclosure. Referring to FIG. 2, the NGINX server 200 according to the embodiments of the present disclosure includes an NGX-QUIC module 21, a detection module 22, and an application layer protocol module 23. The application layer protocol module 23 includes an HTTP/1.1 unit 231, an HTTP/2.0 unit 232, and an RTMP unit 233. The client device 100 in FIG. 2 is equivalent to the client device 12 in FIG. 1, the NGINX server 200 in FIG. 2 is equivalent to the NGINX server 11 in FIG. 1, and the upstream server 300 in FIG. 2 is equivalent to the upstream server 13 in FIG. 2.

The NGX-QUIC module 21 is responsible for processing the QUIC protocol stack, including processing configuration items of QUIC, processing services of QUIC, and the like. With respect to uplink transmission, upon receiving a first QUIC message from the client device 100, the NGX-QUIC module 21 sends the first QUIC message to the QUIC protocol stack, such that the QUIC protocol stack processes the first QUIC message to derive a first application layer data packet. The application layer protocol module 23 sends a first data stream including the first application layer data packet to the upstream server 300. With respect to downlink transmission, the application layer protocol module 23 receives a second data stream from the upstream server 300, sends a second application layer data packet in the second data stream to the QUIC protocol stack, such that the QUIC protocol stack processes the second application layer data packet to derive a second QUIC message. The NGX-QUIC module 21 sends the second QUIC message to the client device 100.

The NGX-QUIC module 21 includes a first cache and a second cache. The first cache is also referred to as a receiving cache. When the QUIC protocol stack is readable, the NGX-QUIC module 21 reads the first application layer data packet from the QUIC protocol stack and caches the first application layer data packet into the first cache. The second cache is also referred to as a sending cache configured to cache second application layer data to be transmitted by an application layer of the NGINX server 200. A second application layer data packet is an application layer data packet included in a second data stream that is received by the NGINX server 200 from the upstream server 300. When the QUIC protocol stack is writable, the NGX-QUIC module 21 writes the second application layer data packet into the second cache to the QUIC protocol stack.

The NGX-QUIC module 21 further hooks various interfaces of the QUIC protocol stack, for example, interfaces for creating new connections, creating new streams, closing streams, closing connections, and the like. By practicing these interfaces on the NGX-QUIC module 21, related service functions are implemented.

The detection module 22 is configured to detect a protocol type of the first application layer data packet. Where the first application layer data packet in the first cache needs to be sent to the upstream server 300 over the application layer of the NGINX server 200, the detection module 22 performs protocol detection on the first application layer data packet to determine whether the first application layer data packet is based on HTTP/1.1, HTTP/2.0, or RTMP.

The application layer protocol module 23 is configured to read the first application layer data packet from the first cache, and send the first data stream including the first application layer data packet to the upstream server 300, or receive the second data stream including the second application layer data packet from the upstream server 300, and cache the second application layer data packet into the second cache.

Referring to FIG. 2, with respect to uplink transmission (that is, the NGINX server 200 sends packets to the upstream server 300), the application layer protocol module 23 is configured to read the first application layer data packet according to the protocol type of the first application layer data packet, and send the read first application layer data packet to the upstream server 300. For example, where the NGINX server 200 is required to support HTTP/1.1 over QUIC, HTTP/2.0 over QUIC, or RTMP over QUIC, then the application layer protocol module 23 includes the HTTP/1.1 unit 231, the HTTP/2.0 unit 232, and the RTMP unit 233, which are configured to send a first application layer data packet based on HTTP/1.1, a first application layer data packet based on HTTP/2.0, and a first application layer data packet based on RTMP, respectively.

In FIG. 2, solid arrows represent a flow direction of the QUIC message, dotted arrows represent a flow direction of the first application layer data packet, and dash-dot arrows represent flow directions of the first data stream and the second data stream.

With respect to downlink transmission, each of the units of the application layer protocol module 23 receives the second application layer data packet from the upstream server 300. The second application layer data packet is also referred to as a data packet to be sent by the application layer of the NGINX server 200. The application layer protocol module 23 caches these second application layer data packets into the second cache of the NGX-QUIC module 21. When the QUIC protocol stack is writable, the second application layer data packet in the second cache is written into the QUIC protocol stack, such that the QUIC protocol stack processes the second application layer data packet to derive the second QUIC message. The NGX-QUIC module 21 sends the second QUIC message to the client device 100.

Hereinafter, based on the network architecture as illustrated in FIG. 1 and the structure of the NGINX server as illustrated in FIG. 2, the data processing method according to the embodiments of the present disclosure is described in detail. Exemplarily, please refer to FIG. 3.

Figure 3:
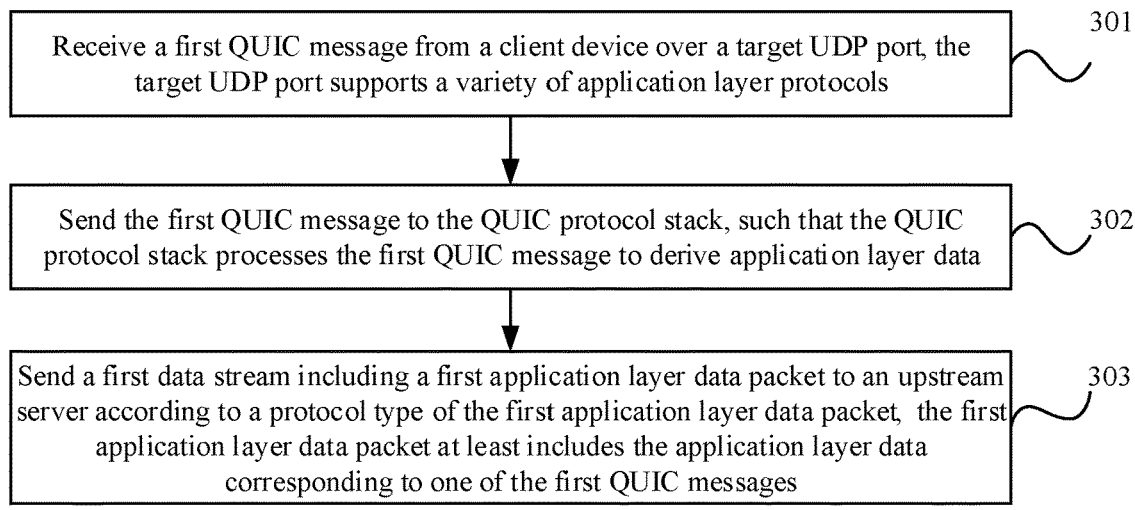
FIG. 3 is a flowchart of a data processing method according to some embodiments of the present disclosure.

FIG. 3 is a flowchart of a data processing method according to some embodiments of the present disclosure. The embodiments are described from the perspective of the NGINX server integrated with the QUIC protocol stack. The method includes the following operations.

At 301, a first QUIC message is received from a client device over a target UDP port. The target UDP port supports a variety of application layer protocols.

In the embodiments of the present disclosure, the target UDP port is, for example, port 443, and a variety of different application layer protocols use the same target UDP port. The different application layer protocols include, but are not limited to, HTTP/1.1, HTTP/2.0, RTMP, or the like. The NGINX server monitors the target UDP port, and receives the first QUIC message from the client device via a network adapter.

Figure 4:
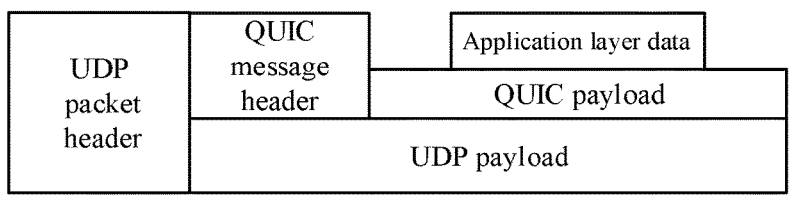
FIG. 4 is a schematic structural diagram of a first QUIC message in the data processing method according to some embodiments of the present disclosure.

FIG. 4 is a schematic structural diagram of a first QUIC message in the data processing method according to some embodiments of the present disclosure. Referring to FIG. 4, a payload of the UDP packet includes the first QUIC message, and the first QUIC message includes a QUIC message header and a QUIC payload. The QUIC payload includes encrypted application layer data. The encrypted application layer data is, for example, data based on HTTP/1.1, HTTP/2.0, or RTMP.

At 302, the first QUIC message is sent to the QUIC protocol stack, such that the QUIC protocol stack processes the first QUIC packet to derive application layer data.

Upon receiving the first QUIC message, the NGINX server does not directly send the QUIC message to an application layer, but sends the first QUIC message to the QUIC protocol stack, such that the QUIC protocol stack processes the first QUIC message. For example, the NGINX server hooks and monitors a read event of the target UDP port, and is responsible for receiving the first QUIC message in a read event handler function and sending the first QUIC message to the QUIC protocol stack over an interface of the QUIC protocol stack. With this technical solution, by hooking the read event handler function of the target UDP port, the first QUIC message is intercepted and sent to the QUIC protocol stack, which is simple and fast.

For better performance, the NGINX server may receive messages (that is, receiving the first QUIC message) using a kernel-supported combined message receive function. The combined packet receive function is, for example, recvmmsg or the like, which is not limited in the embodiments of the present disclosure.

With respect to uplink transmission, the processing by the QUIC protocol stack includes out-of-order reassembly, repeated filtering, check, decryption, and the like. Upon processing by the QUIC protocol stack, the first application layer data packet is derived. For example, the QUIC protocol stack successively receives two first QUIC messages. The first one carries 200-byte application layer data with a serial number 20, and the second one carries 300-byte application layer data with a serial number 19. The QUIC protocol stack decrypts the two first QUIC messages to derive plaintext application layer data, and reassembles the application layer data to derive a 500-byte first application layer data packet. The 500-byte first application layer data packet includes the No. 19 application layer data and the No. 20 application layer data following the No. 19 application layer data.

Still for example, the QUIC protocol stack receives two first QUIC messages. The two first QUIC messages carry the same application layer data. In this case, the QUIC protocol stack deletes one of the two first QUIC messages.

Still for example, the QUIC protocol stack receives two first QUIC messages and decrypts these two QUIC messages into plaintext data. One of the two first QUIC messages carries application layer data with a serial number 3, and the other of the two first QUIC messages carries application layer data with a serial number 14. The QUIC protocol stack stores the No. 3 application layer data and the No. 14 application layer data into a read cache of the QUIC protocol stack, but does not notify the application layer to read the data, that is, the QUIC protocol stack is unreadable. In the case that all the No. 4 to No. 13 application layer data is stored into the read cache of the QUIC protocol stack, the QUIC protocol stack is readable. In this case, the application layer is notified to read, from the QUIC protocol stack, one or more first application layer data packets corresponding to the No. 3 to No. 14 application layer data.

At 303, a first data stream including a first application layer data packet is sent to an upstream server according to a protocol type of the first application layer data packet. The first application layer data packet at least includes the application layer data corresponding to one of the first QUIC messages.

In the embodiments of the present disclosure, the NGINX server sends the first data stream including the first application layer data packet to the upstream server according to the protocol type of the first application layer data packet. It is apparent that the first application layer data packet in the first data stream sent by the application layer is not a data packet derived by a monitoring network adapter from the target UDP port, but is the first application layer data packet derived upon data processing by the QUIC protocol stack. The first application layer data packet may be a data packet based on RTMP, HTTP/1.1, or HTTP/2.0.

The data processing method according to the embodiments of the present disclosure is applicable to an NGINX server integrated with a QUIC protocol stack. Upon receiving a first QUIC message from a client device, the NGINX server sends the first QUIC message to the QUIC protocol stack, such that the QUIC protocol stack processes the first QUIC message to derive application layer data, and sends a first data stream including a first application layer data packet to an upstream server according to a protocol type of the first application layer data packet. With this technical solution, by integrating the QUIC protocol stack on the NGINX server, a scenario of using QUIC based on NGINX is practiced and a variety of types of application layer protocols are supported, and in addition, different application layer protocols use a same UDP port, thereby reducing port overhead.

In some embodiments, in the process of sending the first data stream including the first application layer data packet to the upstream server according to the protocol type of the first application layer data packet, when the QUIC protocol stack is readable, the NGINX server reads the first application layer data packet form the QUIC protocol stack, and caches the first application layer data packet into a first cache. Afterwards, according to the protocol type of the first application layer data packet, the NGINX server reads the first application layer data packet from the first cache and transmits the first data stream including the first application layer data packet to the upstream server.

In the embodiments of the present disclosure, when the first application layer data packet is cached into a read cache of the QUIC protocol stack, the QUIC protocol stack is readable. In this case, the NGINX server reads the first application layer data packet from the read cache of the QUIC protocol stack, and caches the first application layer data packet into the first cache, that is, a receiving cache.

When the first application layer data packet is cached into the first cache, the NGINX server reads the first application layer data packet from the first cache according to the protocol type of the first application layer data packet. Afterwards, the NGINX server sends the first data stream including the first application layer data packet to the upstream server.

With this technical solution, when the QUIC protocol stack is readable, the NGINX server reads the first application layer data packet from the QUIC protocol stack and caches the same into the first cache, and the NGINX server reads the first application layer data packet from the first cache in the first application layer instead of reading by the monitoring network adapter. In this way, a scenario of using QUIC based on NGINX is practiced and a variety of types of application layer protocols are supported, and in addition, different application layer protocols use a same UDP port, thereby reducing port overhead.

Hereinafter description is given from the perspective of uplink transmission, hereinafter detailed description is given to illustrate how the application layer of the NGINX server sends the second application layer data packet in the second data stream to the client device during downlink transmission, that is, the NGINX server receives the second data stream from the upstream server. Exemplarily, please refer to FIG. 5.

Figure 5:
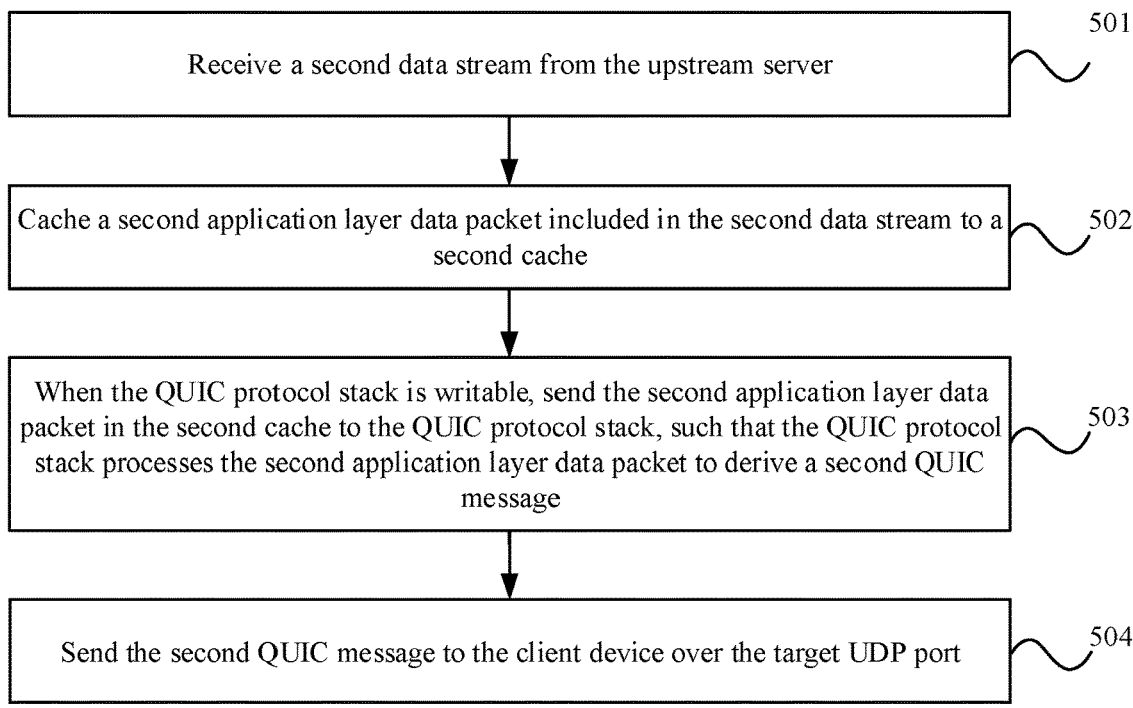
FIG. 5 is another flowchart of the data processing method according to some embodiments of the present disclosure.

FIG. 5 is another flowchart of the data processing method according to some embodiments of the present disclosure. The method is described from the perspective of downlink transmission. The method includes the following operations.

At 501, a second data stream is received from the upstream server.

In this operation, the application layer of the NGINX server receives the second data stream from the upstream server such as a stream media server or the like. The second data stream includes at least one second application layer data packet. The second application layer data packet is referred to as a data packet that is to be sent by the application layer of the NGINX server.

At 502, a second application layer data packet included in the second data stream is cached into a second cache.

In the embodiments of the present disclosure, upon receiving the second data stream, the application layer of the NGINX server does not directly send the second application layer data packet to a client device over a network adapter, but caches the second application layer data packet into the second cache, that is, a sending cache.

At 503, when the QUIC protocol stack is writable, the second application layer data packet in the second cache is sent to the QUIC protocol stack, such that the QUIC protocol stack processes the second application layer data packet to derive a second QUIC message.

In the embodiments of the present disclosure, when a write cache of the QUIC protocol stack is vacant, the QUIC protocol stack is writable. For example, a 50% idle space of the write cache means that the QUIC protocol stack is writable. In this case, the NGINX server writes the second application layer data packet into the second cache to the write cache of the QUIC protocol stack, such that the QUIC protocol stack performs a QUIC message assemble operation such as adding a QUIC message header, a UDP packet header, or the like, such that the second QUIC message is derived.

At 504, the second QUIC message is sent to the client device over the target UDP port.

The NGINX server sends the second QUIC message to the client device over the target UDP port. For example, the NGINX server hooks a packet send interface of the QUIC protocol stack, and sends the second QUIC message which is derived by assembling the second application layer data packet by the NGX-QUIC module. For improvement of the sending performance, the NGINX server may send messages using a kernel-supported combined message send function, that is, sending the second QUIC message. The combined message send function is, for example, a generic segmentation offload (GSO) function, a sendmmsg function, or the like.

With this technical solution, during downlink transmission, by caching the second application layer data packet in the second data stream and delivering the same to the QUIC protocol stack for processing, a scenario of using QUIC based on NGINX is practiced and a variety of types of application layer protocols are supported, and in addition, different application layer protocols use the same UDP port, thereby reducing port overhead.

In some embodiments, prior to sending the first application layer data packet to the upstream server according to the protocol type of the first application layer data packet, the NGINX server further hooks a first receive interface based on HTTP of the application layer of the NGINX server, and reads the first application layer data packet form the first cache over the first receive interface. Afterwards, the NGINX server detects the protocol type of the first application layer data packet. The protocol type includes HTTP/1.1, HTTP/2.0, or RTMP.

Referring to FIG. 2, in the embodiments of the present disclosure, the NGINX server 200 needs to simultaneously support HTTP/1.1, HTTP/2.0, HTTP/3.0, and RTMP, and needs to be provided with a detection module 22. The NGINX server 200 has an application layer to connect to a native receive (recv) interface. Alternatively, the application layer may also be mounted to the native receive interface. For example, the application layer may be mounted to the same interface to receive packets, and then sends packets to different application layer units. The native receive (recv) interface may be identified as supporting HTTP/1.1, HTTP/2.0, or RTMP. For example, two simple functions are mounted to the native receive (recv) interface, respectively corresponding to a first receive interface based on HTTP and a second receive interface based on RTMP. The HTTP/1.1 unit and the HTTP/2.0 unit both read the first application layer data packet from the first cache over the first receive interface.

When the first application layer data packet is cached into the first cache, the NGX-QUIC module 21 of the NGINX server 200 hooks the first receive interface based on HTTP of the application layer, for example, the first receive interface or the second receive interface. Afterwards, the NGX-QUIC module 21 reads the first application layer data packet from the first cache, for example, reading one or more bytes of the first application layer data packet, and detects the protocol type of the first application layer data packet based on the read bytes. The protocol type includes HTTP/1.1, HTTP/2.0, or RTMP.

As such, the bytes read by protocol detecting is fed through the HTTP unit, for example, the HTTP/1.1 unit to the detection module, and the detection module analyzes the one or more bytes of the first application layer data packet to determine which application layer protocol the first application layer data packet uses. The application layer protocol includes, but is not limited to, HTTP/1.1, HTTP/2.0, RTMP, or the like.

With this technical solution, by protocol detecting, different application protocols use the same target UDP port and the same UDP port serves different application layer protocols, such that UDP port overhead is reduced, and application range of the scenario of using QUIC based on NGINX is widened.

In some embodiments, when detecting the protocol type of the first application layer data packet using the detection module, the NGINX server creates an application layer connection for the first application layer data packet using a first file descriptor fd, where the first fd is different from a second file descriptor fd of the first QUIC message. Afterwards, the NGINX server adds a detection (e.g. peek) interface for the application layer connection, and detects the protocol type of the first application layer data packet using the peek interface.

In the traditional scheme of sharing ports by different application layer protocols based on Transmission Control Protocol (TCP), detecting (e.g. peeking) of HTTP/2.0 or RTMP is implemented by performing message detection (e.g. MSG_PEEK) operation on the receive interface for the fd of TCP with three handshakes completed. However, in the embodiments of the present disclosure, the fd of the application layer, that is, the first fd is a fd not experiencing three handshakes. Therefore, detecting (e.g. peeking) may fail. Accordingly, in some embodiments, an application layer connection is created for the first application layer data packet, and a peek interface is added to the application layer connection and a detecting (e.g. peeking) function of HTTP/2.0 or RTMP is modified. The reason why the detecting (e.g. peeking) function of HTTP/1.1 is not modified is that the first application layer data packet for protocol detecting is fed from the HTTP/1.1 unit.

During protocol detecting, where one first application layer data packet is a UDP data packet, detecting is performed by the peek interface added for the application layer. Where one first application layer data packet is a TCP data packet, a traditional TCP-based port sharing detecting scheme is employed.

In some embodiments, the peek interface added for the application layer connection hooks a peeking function in the NGX-QUIC module, for example, an ngx_quic_peek function. Inside the peeking function, data received from the QUIC protocol stack is only copied to an upper layer, that is, an application layer module, for example, RTMP or HTTP/2.0, and upon copying, the corresponding subscript may not move, that is, the pointer may not move. As such, next time when the application layer calls a receive function (ngx_quic_recv), the data is still present, and may be read again from the head. That is, the NGX-QUIC module is not responsible for protocol detecting. Protocol detecting uses the peek interface added by a kernel layer for the application layer connection, and a detecting interface for performing protocol detecting for UDP is mounted to the application layer. Upon completion of detecting, the data is still present at the original location rather than being read and moved away. For example, one or more bytes of the first application layer data packet are only detected, and upon detecting, the one or more bytes are still present in the first cache. Such detecting may not be considered as a read operation, because generally upon the read operation, the pointer would move backwards. In some embodiments, by adding the peek interface, the pointer may not move.

It should be noted that one QUIC connection may have a plurality of streams, each stream corresponds to an application layer connection, the application layer connection is virtual, the first fd is not a fd derived by three handshakes, and the application layer connection is, for example, an HTTP connection, an RTMP connection, or the like.

With this technical solution, by improving the TCP-based port sharing detecting scheme, the detection module supports both TCP-based port sharing detecting and UDP-based port sharing detecting. In this way, the service application range of the NGINX server is improved, and the cost and workload are reduced.

In some embodiments, during sending the first application layer data packet to the upstream server according to the protocol type of the first application layer data packet, the NGINX server hooks the second receive interface based on RTMP of the application layer of the NGINX server, and reads the first application layer data packet from the first cache over the second receive interface and sends the first application layer data packet to the upstream server when the protocol type of the first application layer data packet is RTMP; and reads the first application layer data packet from the first cache over the first receive interface and sends the first application layer data packet to the upstream server when the protocol type of the first application layer data packet is HTTP/1.1 or HTTP/2.0.

Exemplarily, in order that the NGINX server simultaneously supports HTTP/1.1 over QUIC, HTTP/2.0 over QUIC, and RTMP over QUIC, an HTTP/1.1 unit, an HTTP/2.0 unit, and an RTMP unit are respectively configured on the NGINX server. The HTTP/1.1 unit is responsible for receiving and sending HTTP/1.1 data packets, the HTTP/2.0 is responsible for receiving and sending HTTP/2.2 data packets, and the RTMP unit is responsible for receiving and sending RTMP data packets.

With respect to receiving HTTP/1.1 data packets and HTTP/2.0 data packets, by taking the receiving of the HTTP/1.1 data packets as an example, the NGX-QUIC module of the NGINX server hooks a first receive interface 1 of the application layer of the NGINX server, calls the read interface of the QUIC protocol stack inside the receive function corresponding to the first receive interface 1 to read the first application layer data packet that has been processed by the QUIC protocol stack and cached into the first cache, and delivers the first application layer data packet to the HTTP/1.1 unit for processing. The HTTP/1.1 unit stores the first application layer data packet into an HTTP data stream, and sends the HTTP data stream to the upstream server.

Likewise, with respect to receiving HTTP/2.0 data packets, the NGX-QUIC module of the NGINX server hooks a first receive interface of the application layer of the NGINX server, calls the read interface of the QUIC protocol stack inside the receive function corresponding to the first receive interface to read the first application layer data packet that has been processed by the QUIC protocol stack and cached into the first cache, and delivers the first application layer data packet to the HTTP/2.0 unit for processing. The HTTP/2.0 unit stores the first application layer data packet into an HTTP data stream, and sends the HTTP data stream to the upstream server.

Likewise, with respect to receiving RTMP data packets, the NGX-QUIC module of the NGINX server hooks a second receive interface of the application layer of the NGINX server, calls the read interface of the QUIC protocol stack inside the receive function corresponding to the second receive interface to read the first application layer data packet that has been processed by the QUIC protocol stack and cached into the first cache, and delivers the first application layer data packet to the RTMP unit for processing. The RTMP unit stores the first application layer data packet into an RTMP data stream, and sends the RTMP data stream to the upstream server.

With this technical solution, by hooking the receive interface of the application layer of the NGINX server, the different protocol units of the application layer are capable of reading the first application layer data packet from the first cache, and sending the first application layer data packet to the upstream server. The entire process is simple and the cost is low.

Hereinbefore, how the application layer of the NGINX server receives the packet and send the packet to the upstream server in the case that the client device sends the first QUIC message to the NGINX server is described. Hereinafter, how the application layer of the NGINX server sends the packet in the case that the upstream server sends the second data stream to the GNINX server is described in detail.

In some embodiments, when the QUIC protocol stack is writable, the NGINX server receives the second data stream from the upstream server, and caches the second application layer data packet included in the second data stream into the second cache.

When the QUIC protocol stack is writable, with respect to sending HTTP/1.1 data packets or HTTP/2.0 data packets, the NGX-QUIC module of the NGINX server hooks the first send interface of the NGINX server, for example, a send_chain interface, and writes, into the write cache of the QUIC protocol stack over a write interface of the QUIC protocol stack, the second application layer data packet to be sent by the HTTP/1.1 unit inside the first send interface, such that the QUIC protocol stack determines when to send the data packet to the client device. The NGX-QUIC module of the NGINX server may mount the same first send interface or different first send interfaces with respect to HTTP/1.1 or HTTP/2.0, which is not limited in the embodiments of the present disclosure.

When the QUIC protocol stack is writable, that is, the idle space of the write cache of the QUIC protocol stack is relatively large, with respect to sending RTMP data packets, the NGX-QUIC module of the NGINX server hooks the second send interface, for example, a send interface, of the NGINX server, and writes, into the write cache of the QUIC protocol stack over the write interface of the QUIC protocol stack, the second application layer data packet to be sent by the RTMP unit inside the second send interface, such that the QUIC protocol stack determines when to send the data packet to the client device.

With this technical solution, by hooking the native send interface of the NGINX server, the different protocol units of the application layer are capable of sending the second application layer data packet to be sent to the client device to the upstream server. The entire process is simple and the cost is low.

In some embodiments, during sending the first QUIC message to the QUIC protocol stacks, when the NGINX server is hot updated or upgraded, the NGINX server determines a target process group from a plurality of process groups of a port reuse group according to a quadruple carried in the first QUIC message. Each of the plurality of process groups has an independent extended Berkeley packet filter (ebpf) resource. Then, the NGINX server selects a target fd from fds of processes in the target process group, and sends the first QUIC message to the QUIC protocol stack using the target fd.

Exemplarily, hot update, also referred to as reload, configuration update, hot reload, reload configuration, or the like, refers dynamically loading configuration, or updating parameters in an application service deployed on the NGINX server but not changing the entire application service or upgrading the application server. Upgrade refers to a version upgrade of the application services, that is, replacing an earlier-version application service with a new-version application service. Upon startup of the NGINX server, a master process is created for one application service, and the master process creates a group of worker processes. During hot update of the application service, upon each reload, a new process group is generated, and thus a plurality of process groups is created upon the hot update. In this case, the NGINX server determines a target process group from the plurality of process groups of the target UDP port according to a quadruple carried in the first QUIC message, and each of the plurality of process groups has an independent ebpf resource. Then, the NGINX server selects a target fd from fds of processes in the target process group. For example, the NGINX server determines a process with a low load from the plurality of processes included in the target process group, determines the fd of this process as the target fd, and sends the first QUIC message to the QUIC protocol stack using the target fd.

With this technical solution, by a decision of queuing the application layer by virtue of ebpf when the kernel selects routing for the first QUIC message, different client devices are differentiated by means of the quadruple, such that data packet disorder caused by hot update or upgrade is addressed.

Figure 6:
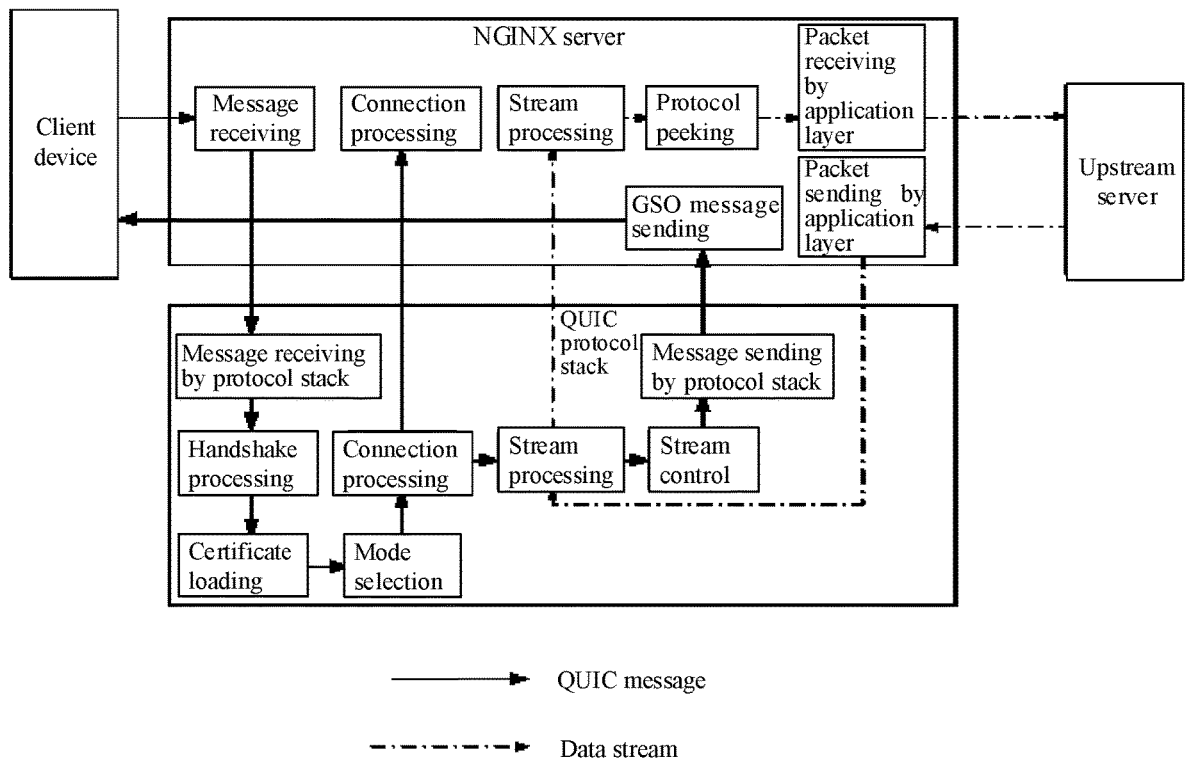
FIG. 6 is a schematic diagram of integrating a QUIC protocol stack on the NGINX server in the data processing method according to some embodiments of the present disclosure.

FIG. 6 is a schematic diagram of integrating a QUIC protocol stack on the NGINX server in the data processing method according to some embodiments of the present disclosure. Referring to FIG. 6, in an uplink transmission scenario, the first QUIC message sent by the client device is fed to the NGINX server, the first QUIC message is sent by the NGX-QUIC module to the QUIC protocol stack. Upon handshake processing, certificate loading, and mode selection, the QUIC protocol stack processes connections. Afterwards, the QUIC protocol stack performs stream processing on the first QUIC message, for example out-of-order reassembly, check, and the like to derive the first application layer data packet. The first application layer data packet is cached into the read cache of the QUIC protocol stack. The read cache of the QUIC protocol stack is not illustrated in FIG. 6.

When the first application layer data packet is cached into a read cache of the QUIC protocol stack, the QUIC protocol stack is readable. In this case, a stream read event is triggered. The NGX-QUIC module reads the first application layer data packet from the QUIC protocol stack, and caches the first application layer data packet into the first cache. The first cache is not illustrated in FIG. 6. Since the NGX-QUIC hooks a first receive interface or a second receive interface of an application layer protocol module, each protocol unit of the application layer protocol module is capable of reading the first application layer data packet from the first cache, such that the application layer receives the packet. Afterwards, each of the protocol units sends the data packets received from the first cache to the upstream server by virtue of streams.

In the downlink transmission scenario, in the case that the second data stream of the upstream server reaches the NGINX server, since the NGX-QUIC module hooks the first send interface or the second send interface of the application layer protocol module, the NGX-QUIC module caches the second data stream into the second cache. The second cache is not illustrated in FIG. 6. When the write cache of the QUIC protocol stack is writable, a stream write event is triggered. The NGX-QUIC module writes the second application layer data packet in the second cache into the write cache of the QUIC protocol stack. The QUIC protocol stack processes the second application layer data packet to derive the second QUIC message. Afterwards, the QUIC protocol stack performs congest control and the like stream control measures. Upon completion of stream control, at a proper time, the message send function of the QUIC protocol stack is called to send the second QUIC message, for example, sending the QUIC message using GSO or the like.

Figure 7:
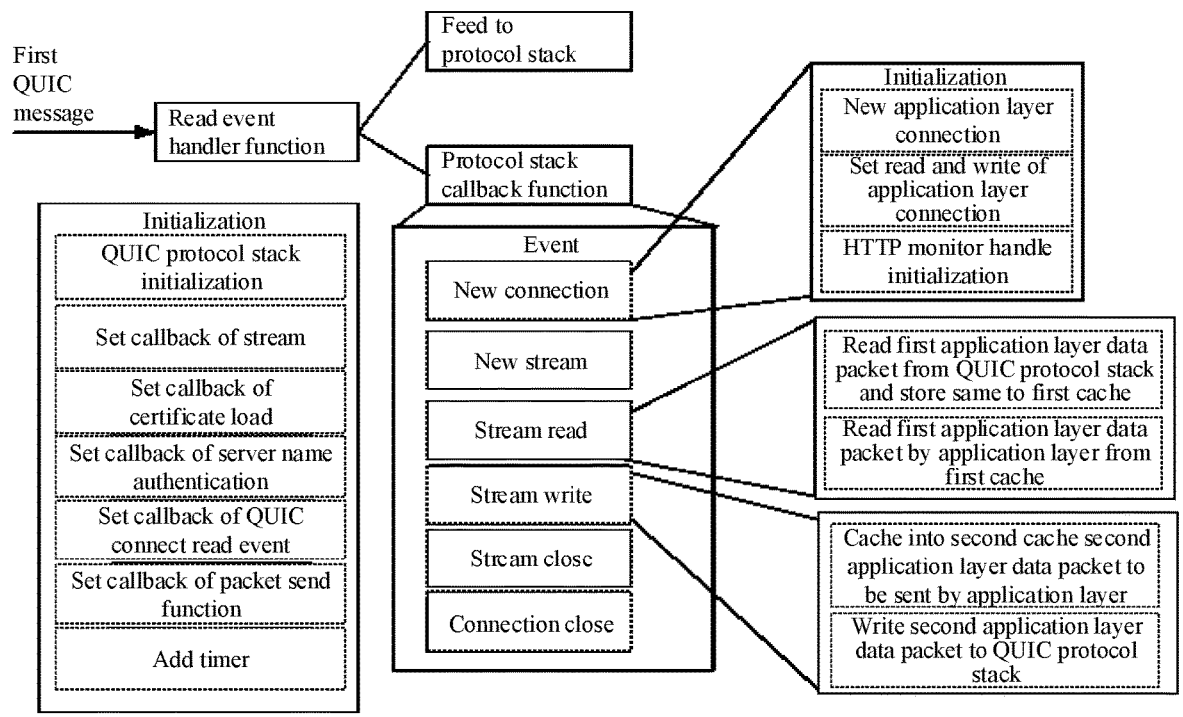
FIG. 7 is a schematic diagram of pre-registering a call-back event in the data processing method according to some embodiments of the present disclosure.

FIG. 7 is a schematic diagram of pre-registering a callback event in the data processing method according to some embodiments of the present disclosure. Referring to FIG. 7, the read event handler function of the UDP port monitored by the NGX-QUIC module is, for example ngx_quic_read_handler. During initialization of the worker process of the NGINX server, callback events are registered to the QUIC protocol stack. The callback events include a stream read (stream read) event and a stream write (stream write) event. Afterwards, during uplink and downlink transmission, when any target event in the callback events triggers callback, the target event is processed.

In some embodiments, the callback events include the stream read event, the stream write event. In some embodiments, the callback events further include a new connection create event, a new stream create event, a stream close event, a connection close event, or the like.

Referring to FIG. 7, the initialization includes initializing QUIC protocol stack (init QUIC stack), setting callback of stream (set QUIC stream callback), setting callback of certificate load (set QUIC load cert callback), setting callback of server name authentication (set QUIC sni callback), setting callback of QUIC connection read event (set QUIC conn read handler), setting callback of packet send function (set pack out callback), and adding timer (add timer to process QUIC conns).

In FIG. 7, the callback function of the QUIC protocol stack is, for example, process quic conns. Upon receiving the first QUIC message using the ngx_quic_read_handler function, the NGINX server sends the first QUIC message to the QUIC protocol stack, and the QUIC protocol stack completes out-of-order reassembly, check, and the like operation for the message. When the QUIC protocol stack is readable, the NGX-QUIC module processes the read event callback.

The NGX-QUIC module calls the callback function process quic conns to process all the callback events, including the new connection create event, the new stream create event, the stream read event, the stream write event, the stream close event, the connection close event, or the like. These callback events have been registered during initialization of the worker process of the NGINX server.

With this technical solution, during initialization of the worker process of the NGINX server, various callback events are registered to the QUIC protocol stack, such that it is ensured that the NGINX server supports a variety of application layer protocols, and application range of using QUIC based on NGINX is improved.

In some embodiments, the data packet send callback function is added to the QUIC protocol stack for sending the second QUIC message that has been assembled by the QUIC protocol stack and is to be sent, which is also set during initialization of the worker process.

Referring to FIG. 7, a timer is added, and various events of the QUIC protocol stack are handled according to the timer. The timer is desired because the QUIC protocol stack is not immediately readable in response to receiving the first QUIC message. For example, in the case that the QUIC protocol stack receives the No. 4 application layer data carried in the first QUIC message, the application layer protocol module has previously read the No. 2 application layer data from the first cache, since the No. 3 application layer data has not been received, the No. 4 application layer data cannot be cached into the first cache. Where the QUIC protocol stack is not readable, a subsequent read event of the QUIC protocol stack needs to be handled using the timer.

With respect to calling back the new connection event by the QUIC protocol stack, the NGINX server creates a connection of the application layer using the first fd, that is, an application layer connection, such that the connection is prevented being closed by the application layer by calling a close function during sending the fd of the target UDP port to the application layer, or some other operations possibly causing problems to the second fd. The application layer connection hooks HTTP, a receive function and a send function corresponding to the application layer connection are set, for example, the recv function, the send function, or the send_chain function, and then initialization of the function is monitored by HTTP.

With respect to calling back the read event by the QUIC protocol stack, the NGX-QUIC module reads the first application layer data packet from the read cache of the QUIC protocol stack, and stores the data packet in the cache corresponding to the application layer connection, and each application layer connection has its own cache. Then, the NGX-QUIC module calls the first receive interface or the second receive interface of the application layer, for example, the HTTP/1.1 unit, the HTTP/2.0 unit, or the RTMP unit, to read the first application layer data packet in the first cache.

With respect to calling back the read event by the QUIC protocol stack, the NGX-QUIC module caches, into the second cache, the second application layer data packet that is to be sent by each of the protocol units of the application layer protocol module by calling the send or send_chain function. When the QUIC protocol stack is writable, the second application layer data packet is written into the write cache of the QUIC protocol stack over the write interface of the QUIC protocol stack. At a proper time, the QUIC protocol stack calls the packet send function of the QUIC protocol stack to send the second QUIC message, for example, sending the QUIC packet using GSO or the like.

Hereinafter apparatus embodiments according to the present disclosure are described, and apparatuses in the embodiments hereinafter may be used for practicing the method embodiments. For details that are not disclosed in the apparatus embodiments, reference may be made to the method embodiments.

Figure 8:
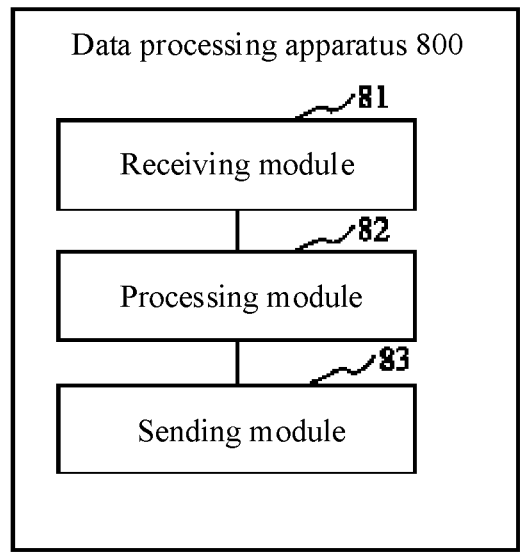
FIG. 8 is a schematic diagram of a data processing apparatus according to some embodiments of the present disclosure.

FIG. 8 is a schematic diagram of a data processing apparatus 800 according to an embodiment of the present disclosure. The data processing apparatus 800 is integrated on an NGINX server. The NGINX server is further integrated with a QUIC protocol stack. The apparatus 800 includes: a receiving module 81, a sending module 83, and a processing module 82.

The receiving module 81 is configured to receive a first QUIC message from a client device over a target UDP port, where the target UDP port supports a variety of application layer protocols.

The processing module 82 is configured to send the first QUIC message to the QUIC protocol stack, such that the QUIC protocol stack processes the first QUIC message to derive application layer data.

The sending module 83 is configured to send a first data stream including a first application layer data packet to an upstream server according to a protocol type of the first application layer data packet, where the first application layer data packet at least includes the application layer data corresponding to one of the first QUIC messages.

In some embodiments, the processing module 82 is further configured to, when the QUIC protocol stack is readable, read the first application layer data packet from the QUIC protocol stack and cache the first application layer data packet to a first cache, and read the first application layer data packet from the first cache according to a protocol type of the first application layer data packet;

The sending module 83 is configured to send the first data stream including the first application layer data packet to the upstream server.

In some embodiments, prior to sending the first data stream including the first application layer data packet by the sending module 83 to the upstream server, the processing module 82 is further configured to: hook a first receive interface based on HTTP of the application layer of the NGINX server; read the first application layer data packet from the first cache over the first receive interface; and detect a protocol type of the first application layer data packet, where the protocol type includes HTTP/1.1, HTTP/2.0, or RTMP.

In some embodiments, in detecting the protocol type of the first application layer data packet, the processing module 82 is configured to: create an application layer connection for the first application layer data packet using a first file descriptor fd, the first fd being different from a second file descriptor fd of the first QUIC message; add a peek interface for the application layer connection; and detect the protocol type of the first application layer data packet using the peek interface.

In some embodiments, the processing module 82 is configured to hook a second receive interface based on RTMP of the application layer of the NGINX server, and read the first application layer data packet from the first cache over the second receive interface when the protocol type of the first application layer data packet is RTMP, and the sending module 83 is configured to send the first application layer data packet to the upstream server;

The processing module 82 is configured to hook a second receive interface based on RTMP of the application layer of the NGINX server, read the first application layer data packet from the first cache over the first receive interface when the protocol type of the first application layer data packet is HTTP/1.1 or HTTP/2.0, and send the first application layer data packet to the upstream server by the sending module 83.

In some embodiments, the receiving module 81 is further configured to receive a second data stream from the upstream server;

the processing module 82 is further configured to cache a second application layer data packet included in the second data stream to a second cache;

the sending module 83 is further configured to: when the QUIC protocol stack is writable, send the second application layer data packet in the second cache to the QUIC protocol stack, such that the QUIC protocol stack processes the second application layer data packet to derive a second QUIC message; and send the second QUIC message to the client device over the target UDP port.

In some embodiments, the processing module 82 is further configured to hook a first send interface of the NGINX server;

the sending module 83 is configured to write the second application layer data packet in the second cache into the QUIC protocol stack over the first send interface when a protocol type of the second application layer data packet is HTTP/1.1 or HTTP/2.0 and the QUIC protocol stack is writable;

the processing module 82 is further configured to hook a second send interface of the NGINX server;

the sending module 83 is configured to write the second application layer data packet in the second cache into the QUIC protocol stack over the second send interface when a protocol type of the second application layer data packet is RTMP and the QUIC protocol stack is writable.

In some embodiments, the processing module 82 is further configured to: register callback events to the QUIC protocol stack when a worker process of the NGINX server is initialized, the callback events including a stream read event and a stream write event; and when any target event of the callback events triggers callback, process the target event.

In some embodiments, the processing module 82 is further configured to hook a read event handler function of the target UDP port;

the sending module 83 is configured to send the first QUIC message to the QUIC protocol stack using the read event handler function.

The data processing apparatus according to the embodiments of the present disclosure is capable of performing the operations of the NGINX server in the above embodiments. The apparatus observes the same principles and achieves the same technical effects, which are not described herein any further.

Figure 9:
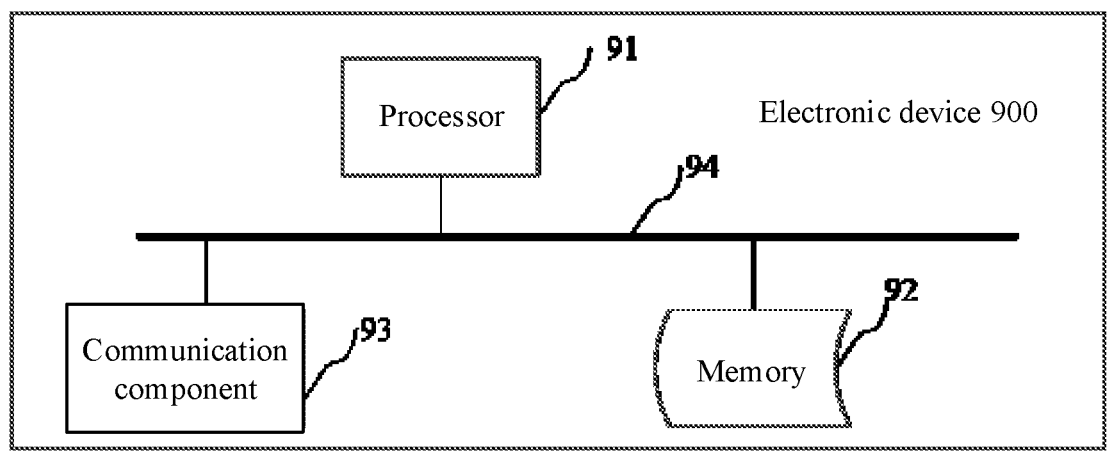
FIG. 9 is a schematic structural diagram of an electronic device according to some embodiments of the present disclosure.

FIG. 9 is a schematic structural diagram of an electronic device 900 according to some embodiments of the present disclosure. As illustrated in FIG. 9, the electronic device 900 is, for example, the NGINX server as described above, and includes:

a processor 91 and a memory 92.

The memory 92 stores one or more computer instructions.

The processor 91, when loading and executing the one or more computer instructions stored in the memory 92, is caused to perform the data processing method performed by the NGINX sever as described in the method embodiments.

For specific implementation of the method by the processor 91, reference may be made to the above method embodiments. The electronic device observes the same principles and achieves the same technical effects, which are not described herein any further.

In some embodiments, the electronic device 900 further includes a communication component 93. The processor 91, the memory 92, and the communication component 93 may be connected via a bus 94.

Some embodiments of the present disclosure further provide a computer-readable storage medium. The computer-readable storage medium stores one or more computer instructions. The one or more computer instructions, when loaded and executed by a processor, cause the processor to implement the data processing method performed by the NGINX server according to any of the above embodiments.

Some embodiments of the present disclosure further provide a computer program product. The computer program product stores one or more computer programs. The one or more computer programs, when loaded and executed by a processor, cause the processor to implement the data processing method performed by the NGINX server according to any of the above embodiments.

Other embodiments of the present disclosure will be apparent to those skilled in the art from consideration of the specification and practice disclosed herein. The present disclosure is intended to cover any variations, uses, or adaptations of the present disclosure following the general principles thereof and including such departures from the present disclosure as coming within common knowledge or customary technical means in the art. It is intended that the specification and embodiments be considered as exemplary only, and the spirit and scope of the present disclosure is subject to the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A data processing method, applicable to an NGINX server integrated with a QUIC protocol stack, the method comprising:

receiving a first QUIC message from a client device over a target UDP port, the target UDP port supporting a variety of application layer protocols;

sending the first QUIC message to the QUIC protocol stack, and processing, by the QUIC protocol stack, the first QUIC message to derive application layer data;

sending a first data stream including a first application layer data packet to an upstream server according to a protocol type of the first application layer data packet, the first application layer data packet including at least the application layer data corresponding to one of first QUIC messages;

receiving a second data stream including a second application layer data packet from the upstream server;

caching the second application layer data packet to a sending cache;

sending the second application layer data packet in the sending cache to the QUIC protocol stack in response to the QUIC protocol stack being writable, such that the QUIC protocol stack processes the second application layer data packet to derive a second QUIC message; and sending the second QUIC message to the client device over the target UDP port;

wherein sending the second application layer data packet in the sending cache to the QUIC protocol stack in response to the QUIC protocol stack being writable comprises:

hooking a first send interface of the NGINX server, and writing the second application layer data packet in the sending cache into the QUIC protocol stack over the first send interface in response to a protocol type of the second application layer data packet being HTTP/1.1 or HTTP/2.0; and hooking a second send interface of the NGINX server, and writing the second application layer data packet in the sending cache into the QUIC protocol stack by the second send interface in response to the protocol type of the second application layer data packet being RTMP.

2. The method according to claim 1, wherein the method further comprises: prior to sending the first data stream including the first application layer data packet to the upstream server according to the protocol type of the first application layer data packet comprises:
reading the first application layer data packet from the QUIC protocol stack;
caching the first application layer data packet to a receiving cache in response to the QUIC protocol stack being readable; and
reading the first application layer data packet from the receiving cache.

3. The method according to claim 2, wherein the method further comprises:
prior to reading the first application layer data packet from the receiving cache, hooking a first receive interface based on HTTP of an application layer of the NGINX server;
reading the first application layer data packet from the receiving cache over the first receive interface; and
prior to sending the first data stream including the first application layer data packet to the upstream server according to the protocol type of the first application layer data packet, detecting the protocol type of the first application layer data packet, the protocol type including HTTP/1.1, HTTP/2.0, or RTMP.

4. The method according to claim 3, wherein detecting the protocol type of the first application layer data packet comprises:
creating an application layer connection for the first application layer data packet using a first file descriptor fd, the first file descriptor fd being different from a second file descriptor fd of the target UDP port;
adding a detection interface for the application layer connection; and
detecting the protocol type of the first application layer data packet using the detection interface.

5. The method according to claim 3, wherein reading the first application layer data packet from the receiving cache and sending the first data stream including the first application layer data packet to the upstream server according to the protocol type of the first application layer data packet comprises:
hooking a second receive interface based on RTMP of the application layer of the NGINX server, and reading the first application layer data packet from the receiving cache over the second receive interface and sending the first application layer data packet to the upstream server in response to the protocol type of the first application layer data packet being RTMP; and
reading the first application layer data packet from the receiving cache over the first receive interface and sending the first application layer data packet to the upstream server in response to the protocol type of the first application layer data packet being HTTP/1.1 or HTTP/2.0.

6. The method according to claim 1, further comprising:
registering a callback event to the QUIC protocol stack in response to a worker process of the NGINX server being initialized, the callback event including a stream read event and a stream write event.

7. The method according to claim 1, wherein sending the first QUIC message to the QUIC protocol stack comprises:

hooking a read event handler function of the target UDP port; and
sending the first QUIC message to the QUIC protocol stack using the read event handler function.

8. The method according to claim 4, wherein reading the first application layer data packet from the receiving cache and sending the first data stream including the first application layer data packet to the upstream server according to the protocol type of the first application layer data packet comprises:
hooking a second receive interface based on RTMP of the application layer of the NGINX server, and reading the first application layer data packet from the receiving cache over the second receive interface and sending the first application layer data packet to the upstream server in response to the protocol type of the first application layer data packet being RTMP; and
reading the first application layer data packet from the receiving cache over the first receive interface and sending the first application layer data packet to the upstream server in response to the protocol type of the first application layer data packet being HTTP/1.1 or HTTP/2.0.

9. An electronic device, comprising: a processor, a memory, and one or more computer programs that are stored in the memory and executable by the processor; wherein the one or more computer programs, when loaded and executed by the processor, cause the electronic device to perform a data processing method;
wherein the method is applicable to an NGINX server integrated with a QUIC protocol stack, and comprises:
receiving a first QUIC message from a client device over a target UDP port, the target UDP port supporting a variety of application layer protocols;
sending the first QUIC message to the QUIC protocol stack, and processing, by the QUIC protocol stack, the first QUIC message to derive application layer data;
sending a first data stream including a first application layer data packet to an upstream server according to a protocol type of the first application layer data packet, the first application layer data packet including at least the application layer data corresponding to one of first QUIC messages;
receiving a second data stream including a second application layer data packet from the upstream server;
caching the second application layer data packet to a sending cache;
sending the second application layer data packet in the sending cache to the QUIC protocol stack in response to the QUIC protocol stack being writable, such that the QUIC protocol stack processes the second application layer data packet to derive a second QUIC message; and
sending the second QUIC message to the client device over the target UDP port;
wherein sending the second application layer data packet in the sending cache to the QUIC protocol stack in response to the QUIC protocol stack being writable comprises:
hooking a first send interface of the NGINX server, and writing the second application layer data packet in the sending cache into the QUIC protocol stack over the first send interface in response to a protocol type of the second application layer data packet being HTTP/1.1 or HTTP/2.0; and
hooking a second send interface of the NGINX server, and writing the second application layer data packet in the sending cache into the QUIC protocol stack by the second send interface in response to the protocol type of the second application layer data packet being RTMP.

10. The electronic device according to claim 9, wherein the method further comprises: prior to sending the first data stream including the first application layer data packet to the upstream server according to the protocol type of the first application layer data packet:
   reading the first application layer data packet from the QUIC protocol stack,
   caching the first application layer data packet to a receiving cache in response to the QUIC protocol stack being readable; and
   reading the first application layer data packet from the receiving cache.

11. The electronic device according to claim 10, wherein the method further comprises:
   prior to reading the first application layer data packet from the receiving cache, hooking a first receive interface based on HTTP of an application layer of the NGINX server;
   reading the first application layer data packet from the receiving cache over the first receive interface; and
   prior to sending the first data stream including the first application layer data packet to the upstream server according to the protocol type of the first application layer data packet, detecting the protocol type of the first application layer data packet, the protocol type including HTTP/1.1, HTTP/2.0, or RTMP.

12. The electronic device according to claim 11, wherein detecting the protocol type of the first application layer data packet comprises:
   creating an application layer connection for the first application layer data packet using a first file descriptor fd, the first file descriptor fd being different from a second file descriptor fd of the target UDP port;
   adding a detection interface for the application layer connection; and
   detecting the protocol type of the first application layer data packet using the detection interface.

13. The electronic device according to claim 11, wherein reading the first application layer data packet from the receiving cache and sending the first data stream including the first application layer data packet to the upstream server according to the protocol type of the first application layer data packet comprises:
   hooking a second receive interface based on RTMP of the application layer of the NGINX server, and reading the first application layer data packet from the receiving cache over the second receive interface and sending the first application layer data packet to the upstream server in response to the protocol type of the first application layer data packet being RTMP; and
   reading the first application layer data packet from the receiving cache over the first receive interface and sending the first application layer data packet to the upstream server in response to the protocol type of the first application layer data packet being HTTP/1.1 or HTTP/2.0.

14. A non-transitory computer-readable storage medium, storing one or more computer programs therein; wherein the one or more computer programs, when loaded and executed by a processor, cause the processor to perform a data processing method;
   wherein the method is applicable to an NGINX server integrated with a QUIC protocol stack, and comprises:
   receiving a first QUIC message from a client device over a target UDP port, the target UDP port supporting a variety of application layer protocols;
   sending the first QUIC message to the QUIC protocol stack, and processing, by the QUIC protocol stack, the first QUIC message to derive application layer data;
   sending a first data stream including a first application layer data packet to an upstream server according to a protocol type of the first application layer data packet, the first application layer data packet including at least the application layer data corresponding to one of first QUIC messages;
   receiving a second data stream including a second application layer data packet from the upstream server;
   caching the second application layer data packet to a sending cache;
   sending the second application layer data packet in the sending cache to the QUIC protocol stack in response to the QUIC protocol stack being writable, such that the QUIC protocol stack processes the second application layer data packet to derive a second QUIC message; and
   sending the second QUIC message to the client device over the target UDP port;
   wherein sending the second application layer data packet in the sending cache to the QUIC protocol stack in response to the QUIC protocol stack being writable comprises:
   hooking a first send interface of the NGINX server, and writing the second application layer data packet in the sending cache into the QUIC protocol stack over the first send interface in response to a protocol type of the second application layer data packet being HTTP/1.1 or HTTP/2.0; and
   hooking a second send interface of the NGINX server, and writing the second application layer data packet in the sending cache into the QUIC protocol stack by the second send interface in response to the protocol type of the second application layer data packet being RTMP.

15. The non-transitory computer-readable storage medium according to claim 14, wherein the method further comprises: prior to sending the first data stream including the first application layer data packet to the upstream server according to the protocol type of the first application layer data packet:
   reading the first application layer data packet from the QUIC protocol stack,
   caching the first application layer data packet to a receiving cache in response to the QUIC protocol stack being readable; and
   reading the first application layer data packet from the receiving cache.

16. The non-transitory computer-readable storage medium according to claim 15, wherein the method further comprises:
   prior to reading the first application layer data packet from the receiving cache, hooking a first receive interface based on HTTP of an application layer of the NGINX server;
   reading the first application layer data packet from the receiving cache over the first receive interface; and
   prior to sending the first data stream including the first application layer data packet to the upstream server according to the protocol type of the first application layer data packet, detecting the protocol type of the first application layer data packet, the protocol type including HTTP/1.1, HTTP/2.0, or RTMP.

17. The non-transitory computer-readable storage medium according to claim 16, wherein detecting the protocol type of the first application layer data packet comprises:
creating an application layer connection for the first application layer data packet using a first file descriptor fd, the first file descriptor fd being different from a second file descriptor fd of the target UDP port;
adding a detection interface for the application layer connection; and
detecting the protocol type of the first application layer data packet using the detection interface.

18. The non-transitory computer-readable storage medium according to claim 16, wherein reading the first application layer data packet from the receiving cache and sending the first data stream including the first application layer data packet to the upstream server according to the protocol type of the first application layer data packet comprises:
hooking a second receive interface based on RTMP of the application layer of the NGINX server, and reading the first application layer data packet from the receiving cache over the second receive interface and sending the first application layer data packet to the upstream server in response to the protocol type of the first application layer data packet being RTMP; and
reading the first application layer data packet from the receiving cache over the first receive interface and sending the first application layer data packet to the upstream server in response to the protocol type of the first application layer data packet being HTTP/1.1 or HTTP/2.0.

* * * * *